(12) United States Patent
Trika et al.

(10) Patent No.: US 8,239,613 B2
(45) Date of Patent: Aug. 7, 2012

(54) HYBRID MEMORY DEVICE

(75) Inventors: Sanjeev N. Trika, Hillsboro, OR (US); Robert Royer, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 256 days.

(21) Appl. No.: 12/346,567

(22) Filed: Dec. 30, 2008

(65) Prior Publication Data

US 2010/0169604 A1 Jul. 1, 2010

(51) Int. Cl.
*G06F 12/06* (2006.01)
(52) U.S. Cl. .............. 711/103; 711/114; 711/E12.008
(58) Field of Classification Search .................. 711/103, 711/E12.001, 114, E12.008
See application file for complete search history.

(56) References Cited

U.S. PATENT DOCUMENTS

| 2003/0061352 A1* | 3/2003 | Bohrer et al. ............ 709/226 |
| 2008/0104309 A1* | 5/2008 | Cheon et al. ............ 711/103 |
| 2008/0126680 A1 | 5/2008 | Lee et al. |
| 2008/0215800 A1* | 9/2008 | Lee et al. ............ 711/103 |
| 2008/0244164 A1* | 10/2008 | Chang et al. ............ 711/103 |
| 2009/0204746 A1* | 8/2009 | Chen et al. ............ 711/103 |
| 2009/0327591 A1* | 12/2009 | Moshayedi ............ 711/103 |
| 2010/0122016 A1* | 5/2010 | Marotta et al. ............ 711/103 |
| 2010/0153616 A1* | 6/2010 | Garratt ............ 711/6 |

FOREIGN PATENT DOCUMENTS

| KR | 2011115871 | * 11/2011 |
| WO | 2010/078044 A2 | 7/2010 |
| WO | 2010/078044 A3 | 9/2010 |

OTHER PUBLICATIONS

International Search Report and Written Opinion received for PCT Patent Application No. PCT/US2009/068495, mailed on Jul. 30, 2010, 9 pages.
Li-Pin Chang 'Hybrid solid-state disks: Combining Heterogeneous NAND Flash in Large SSDs', Design Automationv Conference 2008, ASPDAC 2008, Asia and South Pacific, Mar. 21-24, 2008, pp. 428-433.
International Preliminary Report on Patentability received for PCT Patent Application No. PCT/US2009/068495, mailed on Jul. 14, 2011, 6 pages.

* cited by examiner

*Primary Examiner* — Pierre-Michel Bataille
(74) *Attorney, Agent, or Firm* — Kacvinsky Daisak PLLC

(57) ABSTRACT

A method is provided. The method includes receiving data and classifying received data in one of several tiers of data. The method also includes storing each tier of data on a different non-volatile memory device.

20 Claims, 3 Drawing Sheets

HYBRID MEMORY DEVICE

BACKGROUND

Computing systems may include non-volatile memory for write-back disk caching to enhance performance of such systems. For example, a computing system may include a non volatile storage media such as NAND media as a data backing unit. A single-level cell NAND media may be employed for write-back disk caching. The single-level NAND media offers relatively high endurance and write performance but is quite expensive. Further, a multi-level cell NAND media may be employed for write-back disk caching. However, the multi-level NAND media has a relatively low endurance and write performance thereby making it unusable for certain applications.

BRIEF DESCRIPTION OF THE DRAWINGS

Features of embodiments of the claimed subject matter will become apparent as the following detailed description proceeds, and upon reference to the drawings, in which like numerals depict like parts, and in which:

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

As discussed in detail below, the embodiments of the present invention function to provide a technique for utilizing a hybrid memory device for managing workloads such as solid state drive workloads and disk caching on non-volatile media. As described below, two or more types of non-volatile memory devices are employed in the hybrid memory device. In certain embodiments a relatively faster memory device (e.g., a Single-Level-Cell (SLC) NAND) is employed to satisfy latency sensitive input/output (I/O) requests, while a relatively slower and relatively inexpensive memory device (e.g., a Multi-Level-Cell (MLC) NAND) is employed for background I/O. Furthermore, data may also be moved between the memory types in the background. As described below, endurance capabilities of such memory devices may be utilized to select a particular memory device type used to satisfy write requests. These techniques achieve a desired performance level while reducing the cost and improving endurance.

References in the specification to "one embodiment", "an embodiment", "an exemplary embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Figure 1:
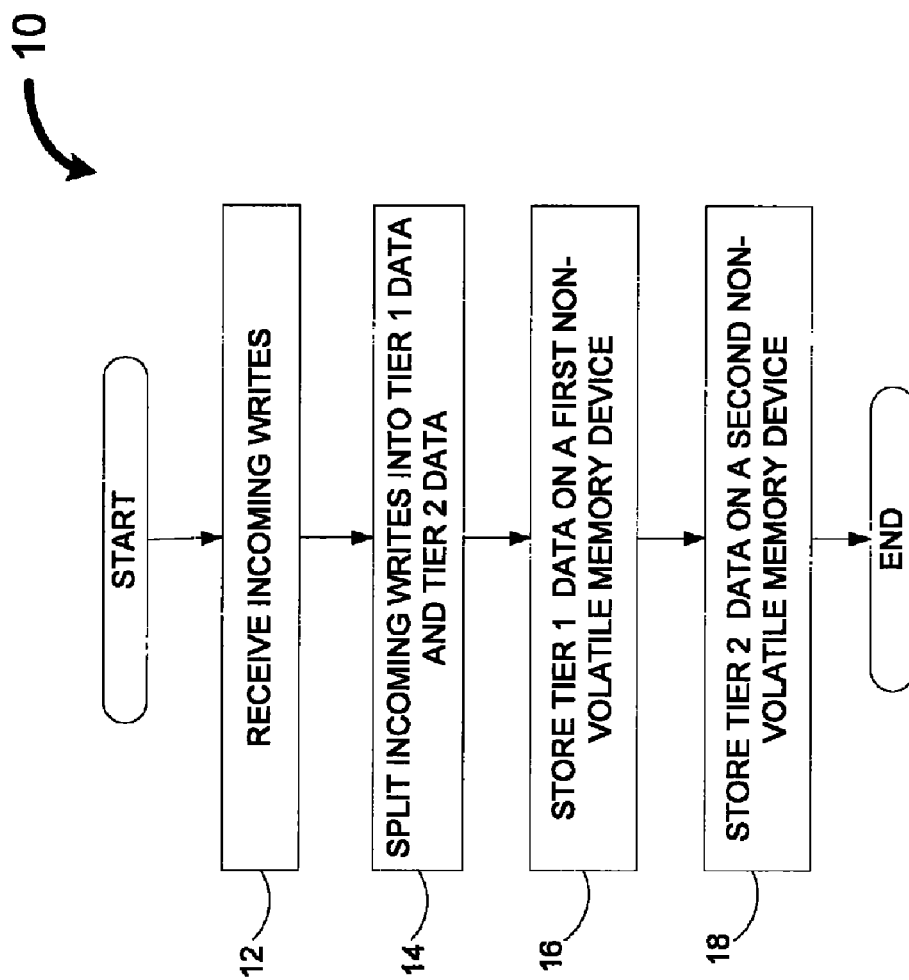
FIG. 1 illustrates an exemplary method for disk caching in accordance with embodiments of present technique.

Referring first to FIG. 1, an exemplary method 10 for disk caching is illustrated. At block 12, incoming writes such as disk cache data is received. In this embodiment, the disk cache data refers to frequently used data so that an operating system or a particular software application implemented by a computing system may access the frequently used data from a relatively faster cache memory as opposed to accessing the information from a relatively slower hard disk of the system. Many types of data and/or instructions may be loaded into the cache memory to increase the performance of the computing system. In certain exemplary embodiments, the disk cache data includes instructions such as instructions for the operating system or a software program that may be executed by the processor of the system. In addition, the disk cache data may also include data that is accessed by these instructions.

At block 14, the incoming writes are split into tier 1 data and tier 2 data. In this exemplary embodiment, the tier 1 data comprises data that is performance and/or error sensitive. In certain embodiments, the tier 1 data comprises user defined writes. In one exemplary embodiment, the tier 1 data comprises user defined high priority writes. In one exemplary embodiment, the tier 2 data comprises user defined low priority writes. In another exemplary embodiment, the tier 2 data comprises background writes corresponding to metadata updates on lazy writes. As used herein, the term "lazy writes" refers to data that is, during idle machine cycles or at some specified time, read from the cache and written to the disk, and require marking the cached data as clean or synchronized with the disk. In another exemplary embodiment, the tier 2 data comprises background writes for read miss insertions. In another exemplary embodiment, the tier 2 data comprises background relocations of data as specified by the background relocation policies.

At block 16, the tier 1 data is stored on a first non-volatile memory device. Non-volatile memory is any kind of memory that has the property of retaining content even when power applied to an associated computing system is removed. In this embodiment, the first non-volatile memory includes a flash memory device. In this exemplary embodiment, the first non-volatile memory device includes a single-level cell (SLC) NAND flash media.

At block 18, the tier 2 data is stored on a second non-volatile memory device. In this embodiment, the second non-volatile memory includes a flash memory device. In this exemplary embodiment, the second non-volatile memory device includes a multi-level cell (MLC) NAND flash media. It should be noted that while more than two types of memory may be used, the exemplary embodiment in this specification uses two types of memory. The split of the data between the first and second non-volatile memory devices is in accordance with a memory management policy. In one exemplary embodiment, the split of the data between the first and second non-volatile memory device is based upon factors such as an expected workload, disk caching policies, NAND policies, and expected performance.

In this exemplary embodiment, the first and second non-volatile memory devices are separate devices. In certain embodiments, the tier 1 and tier 2 data may be stored on a single memory device having cells that can be programmed in single-level and multi-level cell modes. It should be noted that the embodiments described herein are applicable for solid state drive, disk-caching or other non volatile memory applications.

Figure 2:
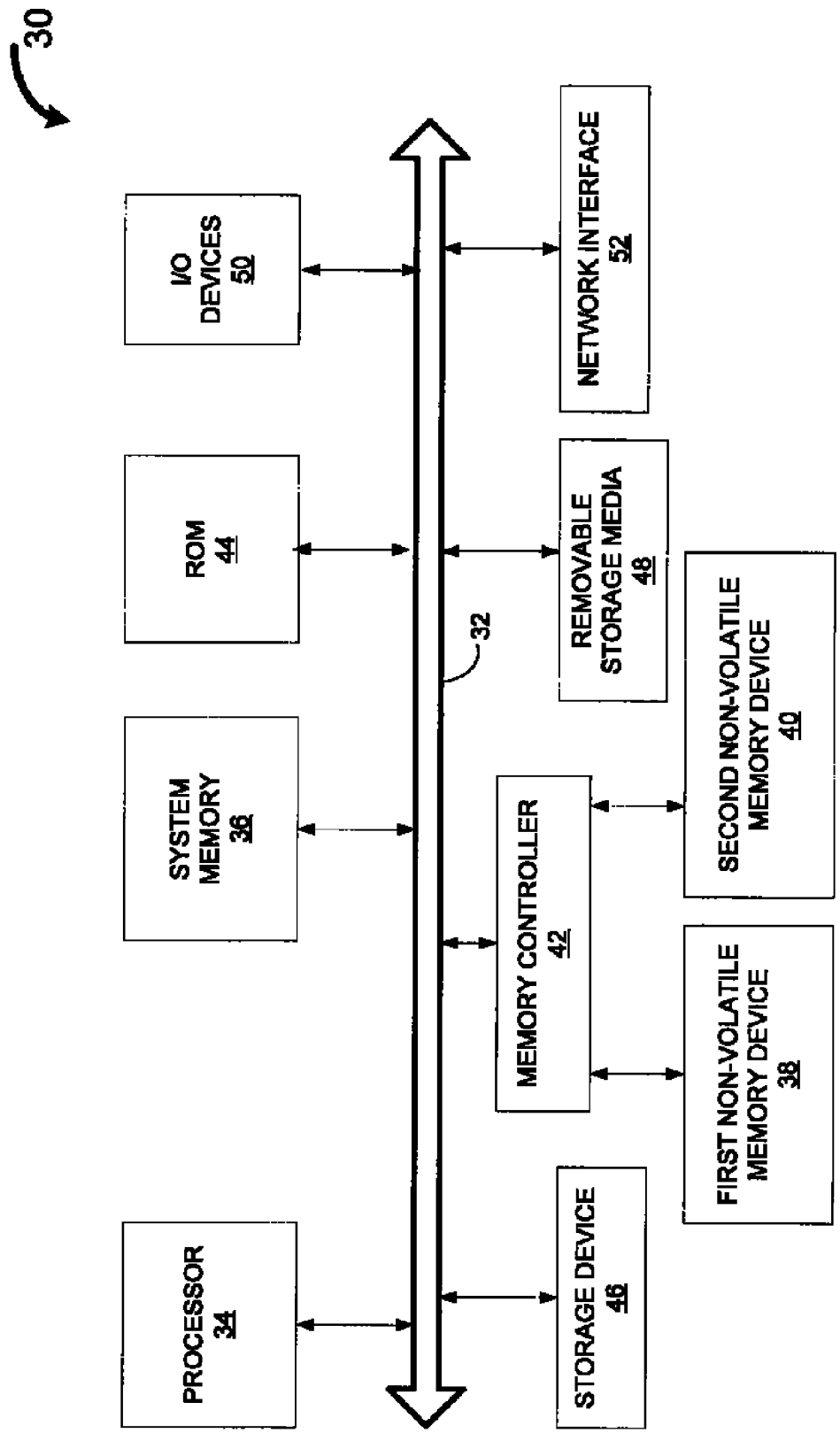
FIG. 2 illustrates a computing system in accordance with embodiments of present technique.

FIG. 2 illustrates a computing system 30 in accordance with embodiments of present technique. The computing system 30 may be used in a variety of applications such as, for example, a personal digital assistant, a two way pager, a cellular phone, a portable computer, a desktop computer, a workstation, or a server. Although the scope and application of the claimed subject matter is in no way limited to these examples.

The computing system 30 includes a bus 32 to which the various components are coupled. In certain embodiments, the bus 32 includes a collection of a plurality of buses such as a system bus, a Peripheral Component Interface (PCI) bus, a Small Computer System Interface (SCSI) bus, etc. Representation of these buses as a single bus 32 is provided for ease of illustration, and it should be understood that the system 30 is not so limited. Those of ordinary skill in the art will appreciate that the computer system 30 may have any suitable bus architecture and may include any number of combination of buses.

A processor 34 is coupled to the bus 32. The processor 34 may include any suitable processing device or system, including a microprocessor (e.g., a single core or a multi-core processor), a network processor, an application specific integrated circuit (ASIC), or a field programmable gate array (FPGA), or any similar device. It should be noted that although FIG. 2 shows a single processor 34, the computing system 30 may include two or more processors.

The computing system 30 further includes system memory 36 coupled to the bus 32. The system memory 36 may include any suitable type and number of memories, such as static random access memory (SRAM), dynamic random access memory (DRAM), synchronous dynamic random access memory (SDRAM), or double data rate DRAM (DDRDRAM). During operation of the computing system 30, an operating system and other applications may be resident in the system memory 36.

Further, the computing system 30 includes a first non-volatile memory device 38 and a second non-volatile memory device 40. In this exemplary embodiment, the first non-volatile memory device 38 is to store tier 1 data and the second non-volatile memory device 40 is to store tier 2 data. In the illustrated embodiment, the first non-volatile memory device 38 includes a single-level cell (SLC) NAND flash media and the second non-volatile memory device 40 includes a multi-level cell (MLC) NAND flash media.

Again, as described before, the tier 1 and tier 2 data may be stored on a single memory device having single-level and multi-level cells. In this exemplary embodiment, an access time of the first non-volatile memory device 38 is relatively lower than an access time of the second non-volatile memory device 40.

In this exemplary embodiment, the tier 1 data comprises data that is performance and/or error sensitive. In certain embodiments, the tier 1 data comprises user defined writes. In one exemplary embodiment, the tier 1 data comprises user defined high priority writes. In one exemplary embodiment, the tier 2 data comprises user defined low priority writes. In another exemplary embodiment, the tier 2 data comprises background writes corresponding to metadata updates on lazy writes, or clean data insertions, or to background writes due to the NAND management relocation policies.

The computing system further includes a memory controller 42 coupled to the first and second non-volatile memory devices 38 and 40, wherein the memory controller 42 is to split the data between the first and second non-volatile memory devices 38 and 40. The memory controller 42 may be integrated with the processor 34. In an alternate embodiment, the memory controller 42 may be a discrete memory controller, wherein the memory controller 42 is external to the processor 34. In certain embodiments, the memory controller 42 may be integrated with a chipset coupled to the processor 34. In certain other embodiments, such as Solid State Drives or hybrid drives, the memory controller 42 and the non-volatile memory devices 38 and 40 may be part of the storage device 46.

The computing system 30 may further include a read-only memory (ROM) 44 coupled to the bus 32. The ROM 44 may store instructions for the processor 34. The computing system 30 may also include a storage device (or devices) 46 coupled to the bus 32. The storage device 46 includes any suitable non-volatile memory, such as, for example, a hard disk drive. The operating system and other programs may be stored in the storage device 46. Further, a device 48 for accessing removable storage media (e.g., a floppy disk drive or a CD ROM drive) may be coupled to the bus 42.

The computing system 30 may also include one or more Input/Output (I/O) devices 50 coupled to the bus 102. Common input devices include keyboards, pointing devices such as a mouse, as well as other data entry devices. Further, common output devices include video displays, printing devices, and audio output devices. It will be appreciated that these are but a few examples of the types of I/O devices that may be coupled to the computing system 30.

The computing system 30 may further comprise a network interface 52 coupled to the bus 32. The network interface 52 comprises any suitable hardware, software, or combination of hardware and software that is capable of coupling the system 30 with a network (e.g., a network interface card). The network interface 52 may establish a link with the network over any suitable medium (e.g., wireless, copper wire, fiber optic, or a combination thereof) supporting exchange of information via any suitable protocol such as TCP/IP (Transmission Control protocol/Internet Protocol), HTTP (Hyper-Text Transmission Protocol, as well as others.

It should be understood that the computing system 30 illustrated in FIG. 2 is intended to represent an embodiment of such a system and, further, that this system may include any additional components, which have been omitted for clarity and ease of understanding. By way of example, the system 30 may include a direct memory access (DMA) controller, a chip set associated with the processor 34, additional memory (e.g., cache memory) as well as additional signal lines and buses. Also, it should be understood that the computer system 30 may not include all the components shown in FIG. 2.

In one exemplary embodiment, the data is split between the single-level cell (SLC) and multi-level cell (MLC) NAND flash media 38 and 40. The ratio of the split between the single-level cell (SLC) and multi-level cell (MLC) NAND flash media 38 and 40 is based upon an expected workload, disk caching policies and NAND management policies. In certain embodiments, dirty data is placed in the SLC NAND flash media 38 and clean data is placed in the MLC NAND flash media 40. As used herein, the term "dirty data" refers to data that is written to the non-volatile memory device and has not been written to the disk yet. Further, the term "clean data" refers to data that has been written to the non-volatile memory device and the disk.

The split of the data between the single-level cell and the multi-level cell NAND flash media 38 and 40 is performed in accordance with a memory management policy. In certain embodiments, the writes that are performance and/or error sensitive are placed on the single-level cell NAND flash media 38 while other writes are placed on the multi-level cell NAND flash media 40. For example, a 32 GB required capacity may be split as 4 GB of single-level cell NAND flash media 38 and 28 GB of multi-level cell NAND flash media 40.

Figure 3:
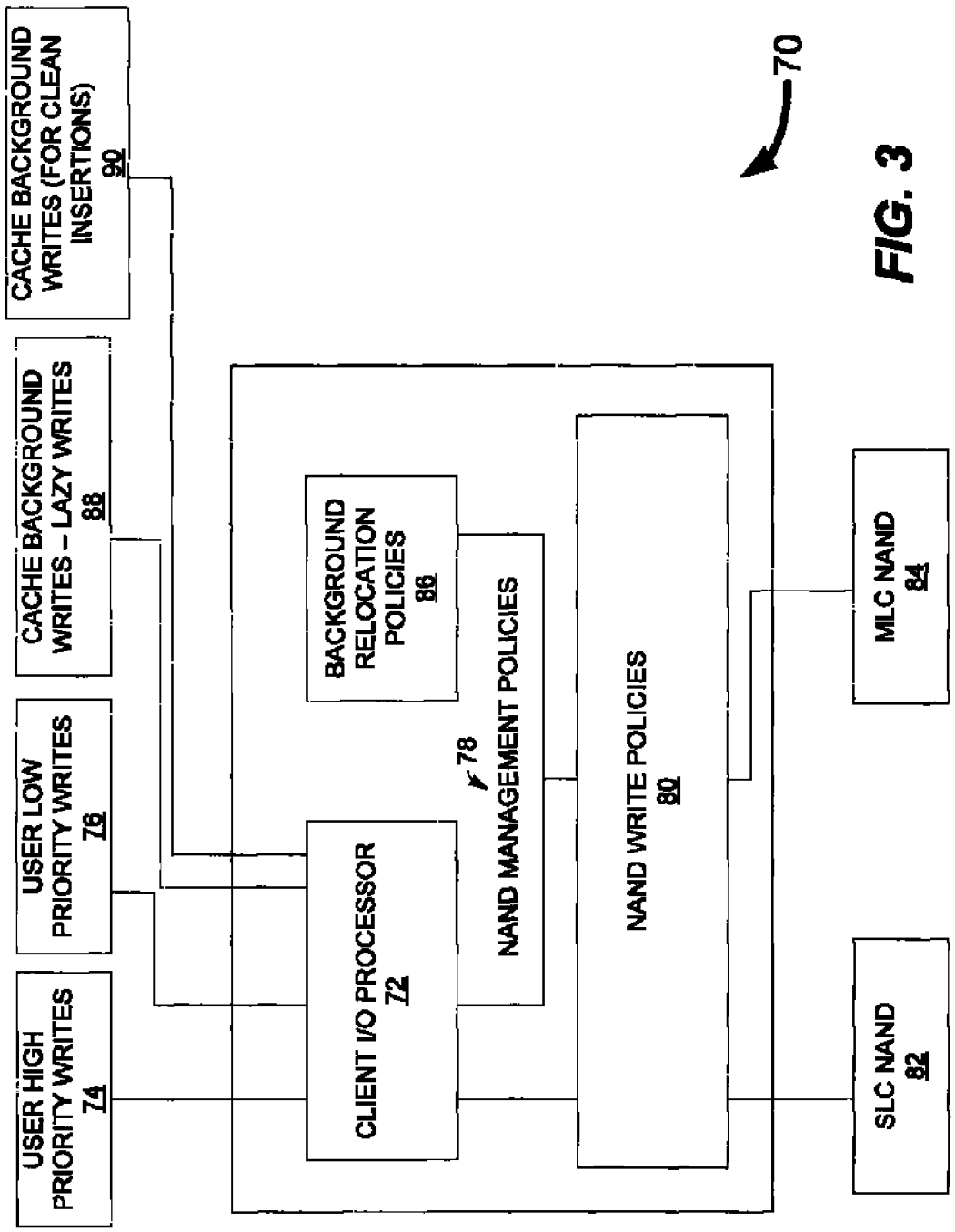
FIG. 3 illustrates an exemplary flow of information in the computing system of FIG. 2 in accordance with embodiments of present technique.

FIG. 3 illustrates an exemplary flow of information 70 in the computing system 30 of FIG. 2. As illustrated, a client Input/Output processor 72 processes the various input and output information to identify user high priority writes 74 and user low priority writes 76. For examples operations such as saving documents, installing a software application etc. may be identified as user high priority writes 74 by the processor 72. Further, operations such as executing background applications for an operating system may be identified as user low priority writes 76.

In accordance with NAND management policies 78 and NAND write policies 80, such writes may be placed on either of the single-level cell NAND flash media 82 and multi-level cell NAND flash media 84. In certain embodiments the NAND management policies include background relocation policies 86 to split the background writes between the single-level cell NAND flash media 82 and multi-level cell NAND flash media 84. In accordance with NAND management policies 78, the split between the single-level cell NAND flash media 82 and multi-level cell NAND flash media 84 may be optimized to enhance NAND performance, lifespan and reliability for caching and for solid state drive loads. In one embodiment, data relocated by the background relocation policies 86 may be classified as tier 2 data and written to the multi-level NAND flash media 84.

In certain embodiments, the NAND management policies 78 and NAND write policies 80 are executed by the memory controller 42 (see FIG. 2). The NAND management policies 78 and the NAND write polices 80 split the data based upon an expected workload, disk caching and NAND management policies. Typically, writes that are performance and/or error sensitive are placed on the single-level cell NAND flash media 82 while other writes are placed on the multi-level cell NAND flash media 84.

For example, the dirty data is placed on the single-level cell NAND flash media 82 while the clean data is placed on the multi-level cell NAND flash media 84. Advantageously, this allows for faster writes on the single-level cell NAND flash media 82 along with a low bit-error ratio (BER) that is required for the dirty data. In operation, if a particular clean data item read from the multi-level cell NAND flash media 84 has an uncorrectable error due to relatively low endurance of the multi-level cell NAND flash media 84, then the data may be read from the disk.

In the illustrated embodiment, the user high priority writes 74 are placed on the single-level cell NAND flash media 82 and the user low priority writes 76 are placed on the multi-level cell NAND flash media 84. Further, certain other writes such as background writes for metadata updates after cleaning dirty writes 88 and background writes for read miss insertions 90 are placed on the multi-level cell NAND flash media 84. This allows capturing the majority of demand writes in relatively faster single-level cell NAND flash media 82 while relegating the relatively performance-insensitive background operations to the slower multi-level cell NAND flash media 84. It should be noted that since reads are relatively fast from both single-level and multi-level cell NAND flash media 82 and 84, the split between the two media facilitates high performance user demand input/output operations.

In certain embodiments, the computing system 30 may employ an input/output priority model (not shown) that differentiates between high priority foreground input/output and lower priority background input/output. In this embodiment, an additional optimization may be performed to only write the high priority foreground input/output to the single-level cell NAND flash media 82. Such optimization allows for relatively better performance for input/output operations thereby enhancing the application performance of the computing system 30.

The system described above may be disposed in any type of computing device, such as a desktop computer, a laptop computer, a server, a hand-held computing device, a wireless communication device, an entertainment system etc. By way of example, the computing system may include a first non-volatile memory device and a second non-volatile memory device. The computing system may also include a memory controller coupled to the first and second non-volatile memory devices, wherein the memory controller is to split disk cache data between the first and second non-volatile memory devices.

The foregoing detailed description and accompanying drawings are only illustrative and not restrictive. They have been provided primarily for a clear and comprehensive understanding of the disclosed embodiments and no unnecessary limitations are to be understood therefrom. Numerous additions, deletions, and modifications to the embodiments described herein, as well as alternative arrangements, may be devised by those skilled in the art without departing from the spirit of the disclosed embodiments and the scope of the appended claims.

The invention claimed is:

1. A system, comprising:
a first non-volatile memory device;
a second non-volatile memory device; and
a memory controller coupled to the first and second non-volatile memory devices, wherein the memory controller is to split data between the first and second non-volatile memory devices;
wherein the first non-volatile memory device is to store user specified high priority writes;
wherein the second non-volatile memory device is to store user defined low priority writes and at least one of metadata updates after lazy writes, or cache background writes for read miss insertions, or clean cache data, or non-volatile memory writes due to background relocations.

2. The system of claim 1, wherein the first non-volatile memory device comprises single-level cell (SLC) NAND flash cells, and the second non-volatile memory device comprises multi-level cell (MLC) NAND flash cells.

3. The system of claim 2, wherein the single-level cell NAND and multi-level cell NAND flash cells are disposed on a NAND flash device.

4. The system of claim 1, wherein the memory controller is to split the disk cache data in accordance with a memory management policy.

5. The system of claim 1, wherein the memory controller is to split disk cache data based upon an expected workload and disk caching policies.

6. A semiconductor device; comprising:
a processor;
a single-level cell (SLC) NAND flash memory device coupled to the processor; and
a multi-level cell (MLC) NAND flash memory device coupled to the processor, wherein at least one of cache workload and a solid state drive workload is split between the single-level cell and multi-level cell NAND flash memory devices;
wherein the processor is to receive instructions from a user to identify high priority writes and low priority writes;
wherein the single-level cell (SLC) NAND flash memory device is to store the high priority writes; and wherein the multi-level cell (MLC) NAND flash memory device is to store the low priority writes and at least one of metadata updates after lazy writes, or cache background writes for read miss insertions, or clean cache data, or non-volatile memory writes due to background relocations.

7. The semiconductor device of claim 6, wherein the split between the single-level cell and the multi-level cell NAND flash memory devices is based upon a NAND management policy.

8. The semiconductor device of claim 6, wherein the single-level cell NAND flash media and the multi-level cell NAND flash memory devices form components of an integrated memory device.

9. The semiconductor device of claim 6, further comprising a memory controller to split the at least one of cache workload and the solid state drive workload into first and second disk workloads.

10. The semiconductor device of claim 6, wherein the multi-level cell (MLC) NAND flash memory device is to store at least one of cache background writes corresponding to lazy writes and cache background writes for read miss insertions.

11. A method, comprising:
splitting a workload data into tier 1 data and tier 2 data; and
transferring the tier 1 and tier 2 data to first and second non-volatile memory devices respectively, wherein an access time of the first non-volatile memory device is relatively lower than an access time of the second non-volatile memory device;
wherein the tier 1 data comprises user specified writes, and the tier 2 data comprises user defined low priority writes and at least one of metadata updates after lazy writes, or cache background writes for read miss insertions, or clean cache data, or non-volatile memory writes due to background relocations.

12. The method of claim 11, wherein the workload data comprises disk cache data.

13. The method of claim 11, wherein the workload data comprises solid state drive workload data.

14. The method of claim 11, wherein the workload data comprises volume spanning data.

15. The method of claim 11, wherein the first non-volatile memory device comprises a single-level cell (SLC) NAND flash memory device and the second non-volatile memory device comprises a multi-level cell (MLC) NAND flash memory device.

16. The method of claim 11, wherein splitting the workload data into tier 1 and tier 2 data comprises splitting the data based upon a NAND management policy.

17. A method, comprising:
receiving data;
classifying received data in one of several tiers of data, the several tiers of data including tier 1 data and tier 2 data;
storing each tier of data on a different non-volatile memory device,
wherein storing the tier 1 data comprises storing user specified writes on a first non-volatile memory device; and
wherein storing the tier 2 data comprises storing user defined low priority writes on a second non-volatile memory device and storing the tier 2 data on the second non-volatile memory device also includes at least one of metadata updates after lazy writes, or cache background writes for read miss insertions, or clean cache data, or non-volatile memory writes due to background relocations.

18. The method of claim 17, wherein the first non-volatile memory device comprises single-level cell (SLC) NAND flash cells, and the second non-volatile memory device comprises multi-level cell (MLC) NAND flash cells.

19. The method of claim 18, wherein the single-level cell NAND and multi-level cell NAND flash cells are on a NAND flash device.

20. The method of claim 17, wherein the tier 1 data comprises dirty cache data.

* * * * *

UNITED STATES PATENT AND TRADEMARK OFFICE
CERTIFICATE OF CORRECTION

| | | |
|---|---|---|
| PATENT NO. | : 8,239,613 B2 | Page 1 of 1 |
| APPLICATION NO. | : 12/346567 | |
| DATED | : August 7, 2012 | |
| INVENTOR(S) | : Sanjeev N. Trika et al. | |

It is certified that error appears in the above-identified patent and that said Letters Patent is hereby corrected as shown below:

On the Title page, in field (56), in column 2, under "Other Publications", line 5, delete "Automationv" and insert -- Automation --, therefor.

Signed and Sealed this

Thirtieth Day of October, 2012

David J. Kappos
*Director of the United States Patent and Trademark Office*